United States Patent [19]

Au et al.

[11] Patent Number: 5,023,817
[45] Date of Patent: Jun. 11, 1991

[54] JAM HISTORY AND DIAGNOSTICS

[75] Inventors: Lai C. Au, Webster; John W. Schaben, Farmington; Robert G. Hamer, Canandaigua; Larry H. Banks, Henrietta, all of N.Y.

[73] Assignee: Xerox Corporation, Stamford, Conn.

[21] Appl. No.: 319,392

[22] Filed: Mar. 6, 1989

[51] Int. Cl.$^5$ .............................................. G06F 11/30
[52] U.S. Cl. .................................. 364/550; 371/16.4; 371/29.1; 377/16
[58] Field of Search ........................ 364/550, 551.01; 371/16.4, 16.5, 29.1; 377/13, 15, 16; 355/203, 204, 205, 206

[56] References Cited

U.S. PATENT DOCUMENTS

| | | | |
|---|---|---|---|
| 4,062,061 | 12/1977 | Batchelor et al. | 371/29.1 X |
| 4,514,846 | 4/1985 | Federico et al. | 371/29.1 X |
| 4,521,847 | 6/1985 | Ziehm et al. | 355/206 X |
| 4,586,147 | 4/1986 | Todokoro | 364/550 |
| 4,589,090 | 5/1986 | Downing et al. | 364/900 |
| 4,663,725 | 5/1987 | Truckenbrod et al. | 364/557 X |
| 4,711,560 | 12/1987 | Hosake et al. | 355/14 C |
| 4,719,587 | 1/1988 | Berte | 364/555.01 X |
| 4,742,483 | 5/1988 | Morrell | 364/900 |
| 4,972,453 | 11/1990 | Daniel, III et al. | 371/15.1 X |

Primary Examiner—Parshotam S. Lall
Assistant Examiner—Edward R. Cosimano
Attorney, Agent, or Firm—Ronald F. Chapuran

[57] ABSTRACT

A technique of storing and displaying machine fault information including the number of actual machine faults and the number of machine almost faults in a reproduction machine having a plurality of components and an operator console with a display screen including the steps of entering a fault history display mode at the operator console to display machine fault histories, the fault histories including the number of actual faults and the number of almost faults of selected components, computing the rate of failure of selected components based on the number of actual failures and the number of almost failures relative to the number of opportunities to fail of said components, and displaying the computed rate of failure for the selected components on the display screen.

5 Claims, 12 Drawing Sheets

JAM HISTORY AND DIAGNOSTICS

BACKGROUND OF THE INVENTION

The invention relates to a system for recording machine jam histories and diagnosing reproduction machines such as copiers and printers, and more particularly, to recording and displaying actual machine jam and machine jam prediction information for such reproduction machines.

As reproduction machines such as copiers and printers become more complex and versatile in the jobs they can do, the interface between the machine and the service rep must necessarily be expanded if full and efficient trouble shooting of the machine is to be realized. A suitable interface must not only provide the controls, displays and messages necessary to monitor and maintain the machine, but must do so in an efficient, relatively simple, and straightforward way.

For example, diagnostic methods involving problems with paper movement usually require that a service rep perform a trend analysis of the problem. This trend analysis is used to determine whether the problem has suddenly appeared, indicating a hard or intermittent failure of a component such as a sensor or driver, or whether the problem has gradually appeared, indicating a wear out type of failure. This analysis is important because some number of paper movement faults are normal and may masks the gradual appearance of wear out related problems. Historically, this analysis has been dependent upon the service rep recording fault histories manually in a machine service log on each service call. The trend analysis consists of the service rep manually reviewing the fault history information recorded in the machine service log for the last several service visits. This method has proven to be time consuming and error prone due to the number of faults.

It is a feature of the present invention to overcome various of the above and other related problems and to thereby make easier, and encourage, the utilization of the full diagnostic capabilities of a modern copying apparatus.

Various diagnostic techniques are known in the prior art. For example, U.S. Pat. No. 4,711,560 discloses a copier which functions according to a sequence control program stored on floppy disk which can also contain a diagnostic program to facilitate maintenance. U.S. Pat. No. 4,742,483 discloses a laser printer including a microprocessor to read data or program information from a cartridge loaded by a user. A special maintenance operating system on the cartridge runs the printer through automatic routines to be checked by a technician.

U.S. Pat. No. 4,586,147 to Tadokoro discloses a history information providing device for a printer including a memory for storing the latest failure information of the machine such as the number of times of paper jams. This history information is classified as follows: failure information, for example, paper jams, or maintenance information, for example, worn condition.

A difficulty with the prior art methods as noted above, is that they are often error prone and time consuming. An object of the present invention, therefore, is to provide a diagnostic technique for automatically recording and displaying actual machine jam and jam prediction information. Further advantages of the present invention will become apparent as the following description proceeds, and the features characterizing the invention will be pointed out with particularity in the claims annexed to and forming a part of this specification.

SUMMARY OF THE INVENTION

Briefly, the present invention is concerned with a technique for storing and displaying machine fault information including the number of actual machine faults and the number of machine almost faults in a reproduction machine having a plurality of components and an operator console with a display screen including the steps of entering a fault history display mode at the operator console to display machine fault histories, the fault histories including the number of actual faults and the number of almost faults of selected components, computing the rate of failure of selected components based on the number of actual failures and the number of almost failures relative to the number of opportunities to fail of said components, and displaying the computed rate of failure for the selected components on the display screen.

For a better understanding of the present invention, reference may be had to the accompanying drawings wherein the same reference numerals have been applied to like parts and wherein:

DETAILED DESCRIPTION OF THE DRAWINGS

Figure 10:
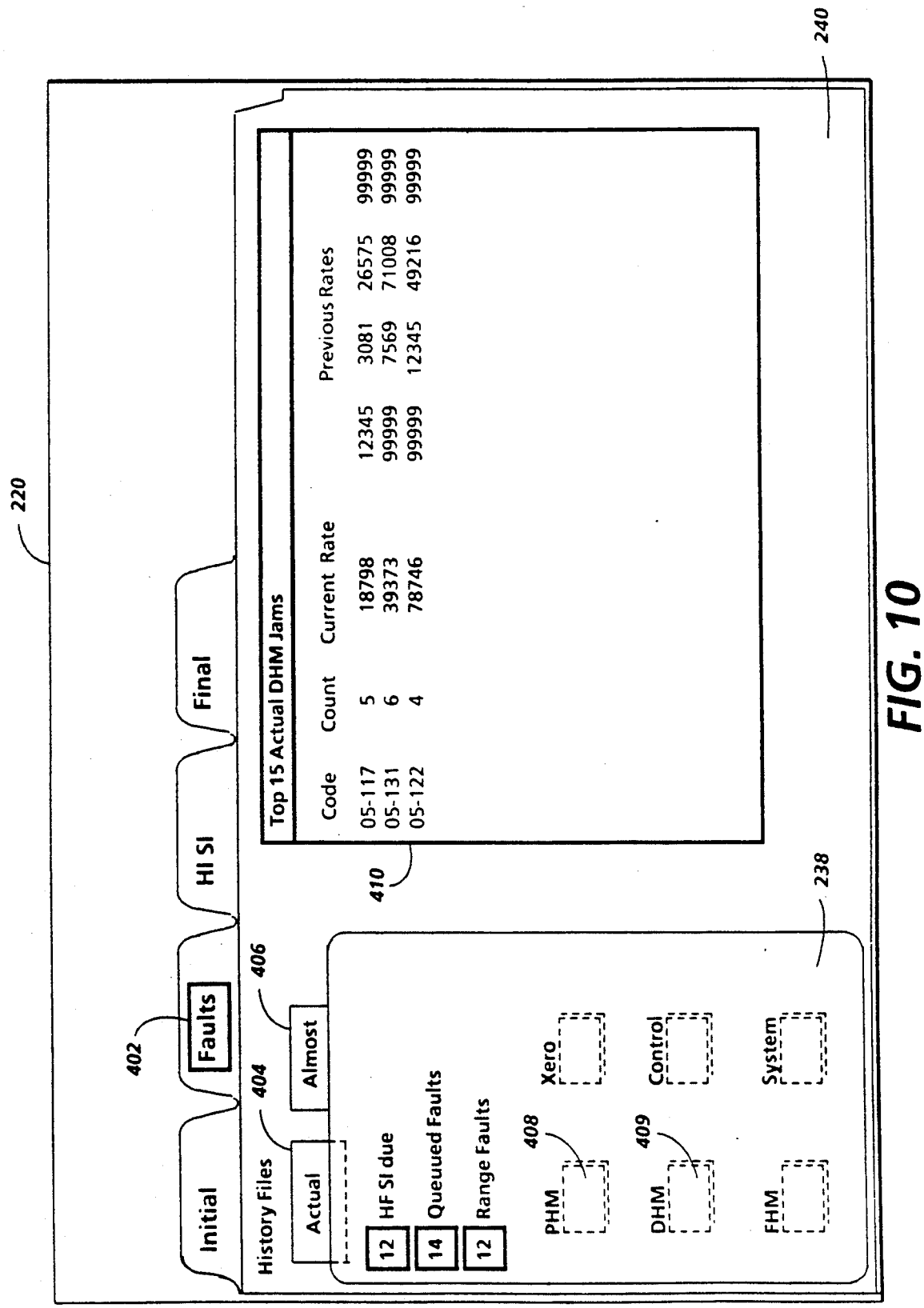
Figure 11:
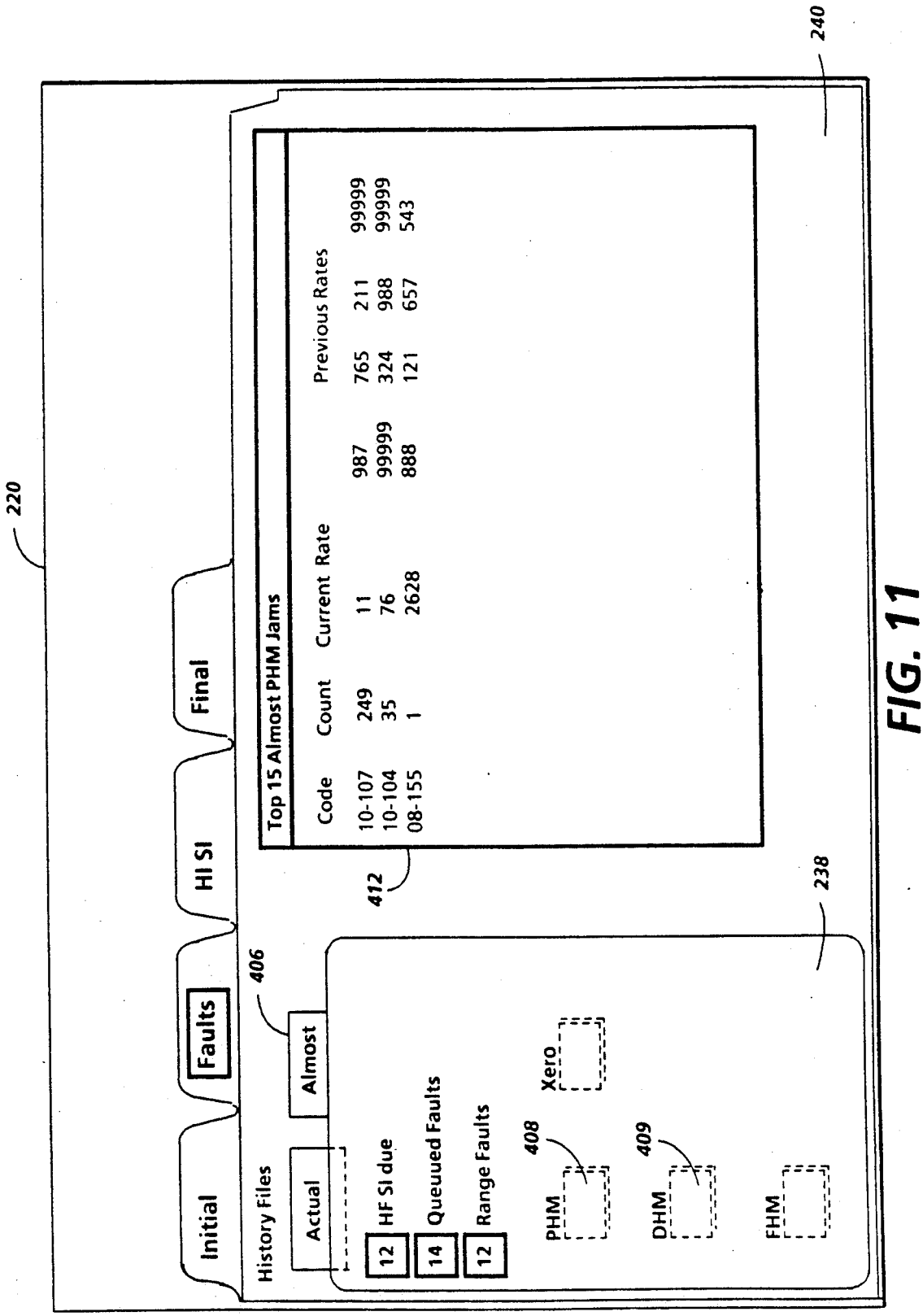

FIGS. 9a, 9b, 9c, and 9d illustrate the jam and almost jam timing states of the machine;

FIG. 10 illustrates actual fault screens in accordance with the present invention; and FIG. 11 illustrates almost fault screens in accordance with the present invention.

Figure 12:
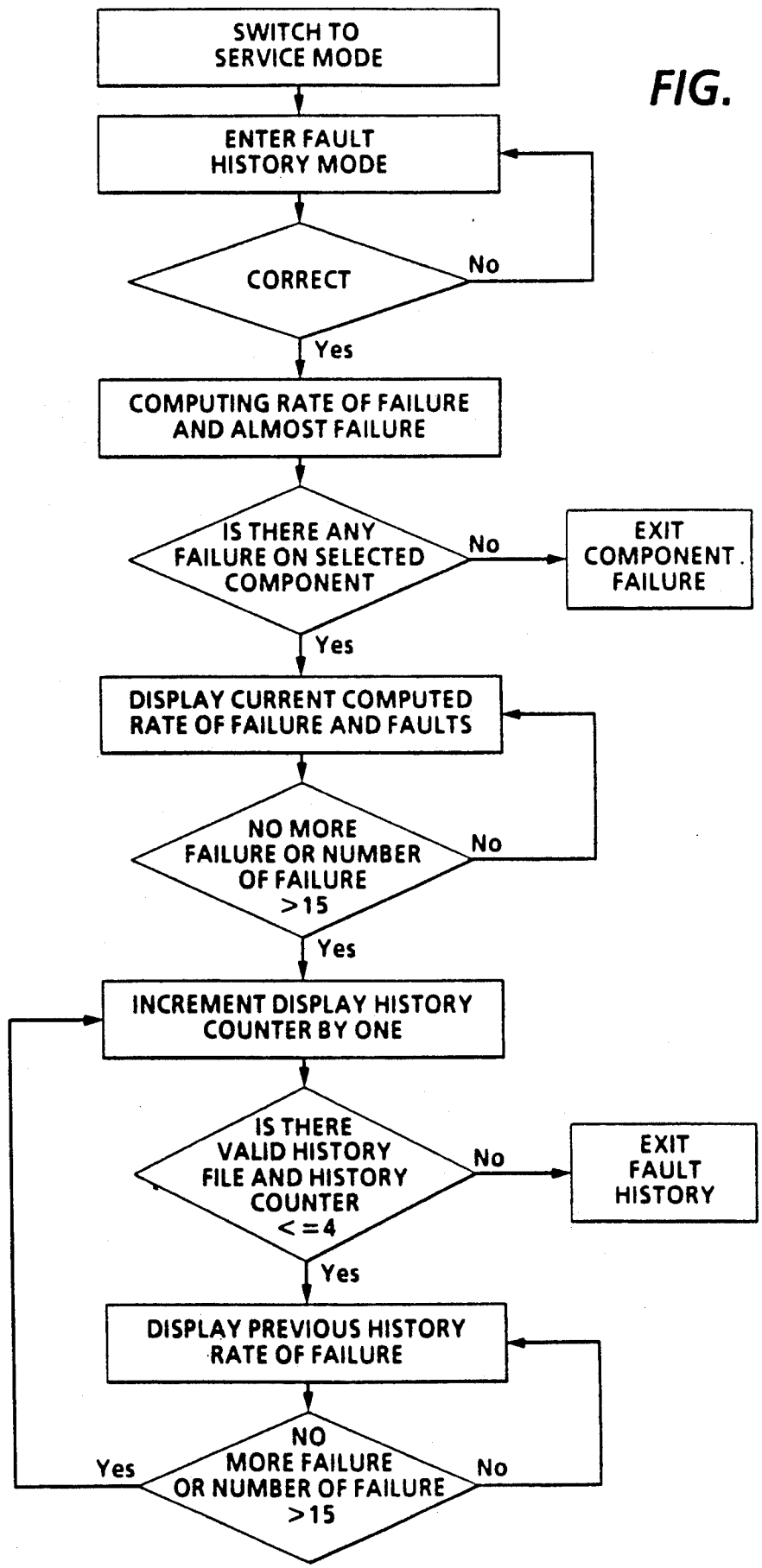

FIG. 12 is a flow chart illustrating the display of failure rates in accordance with the present invention.

While the present invention will hereinafter be described in connection with a preferred embodiment thereof, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF THE PREFERRED EMBODIMENT

Figure 1:
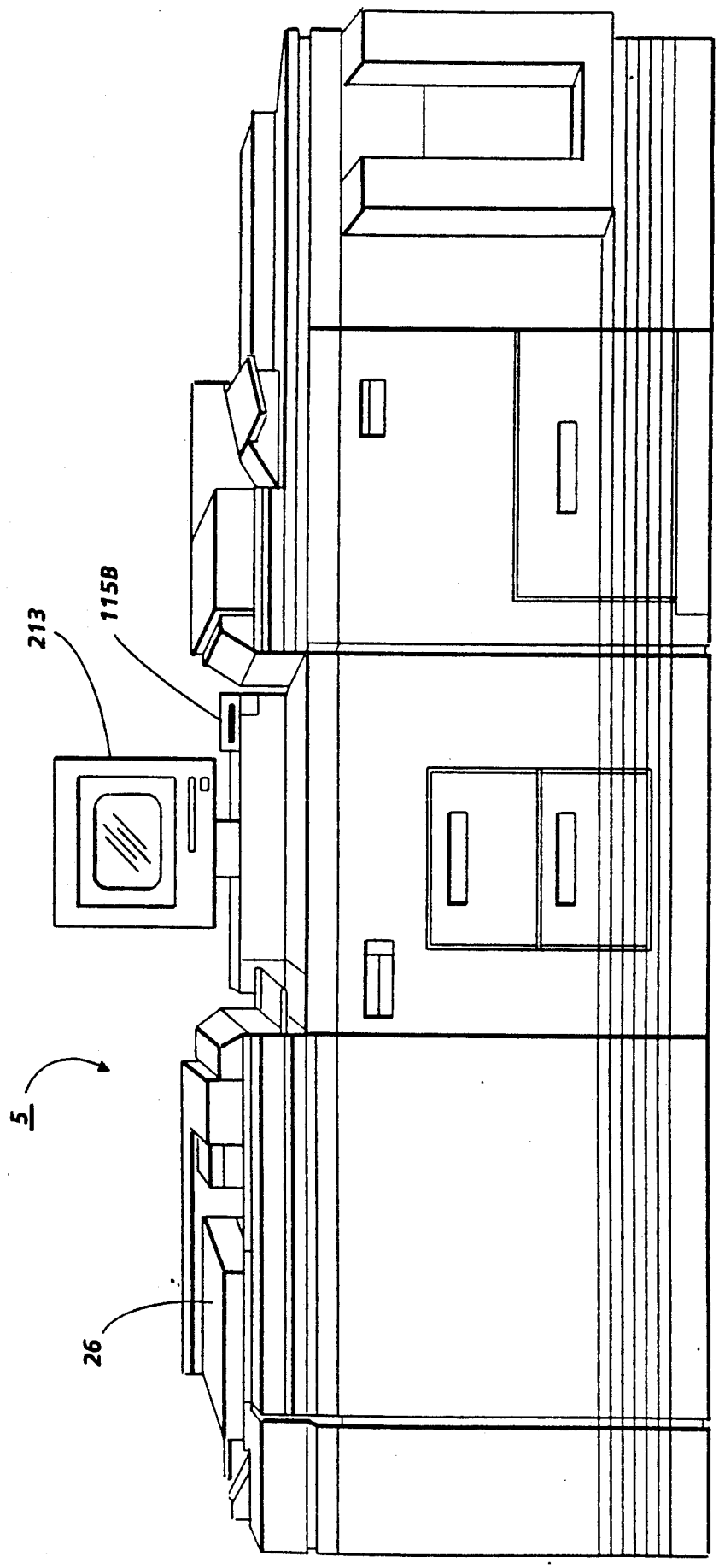
FIG. 1 is an isometric view of an illustrative reproduction machine incorporating the touch dialogue User Interface (U.I.) of the present invention.
Figure 2:
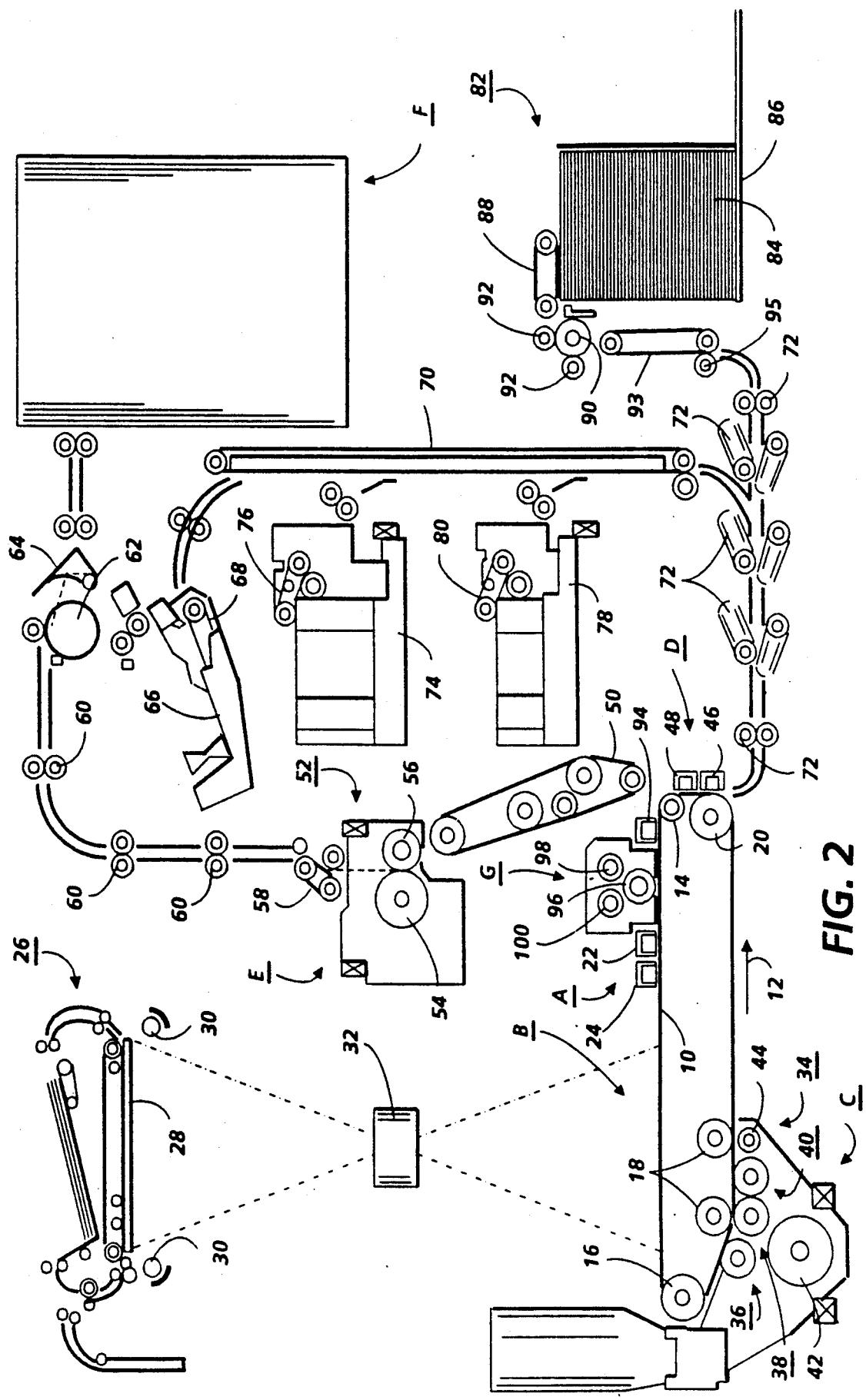
FIG. 2 is a schematic elevational view depicting various operating components and sub-systems of the machine shown in FIG. 1.
Figure 3:
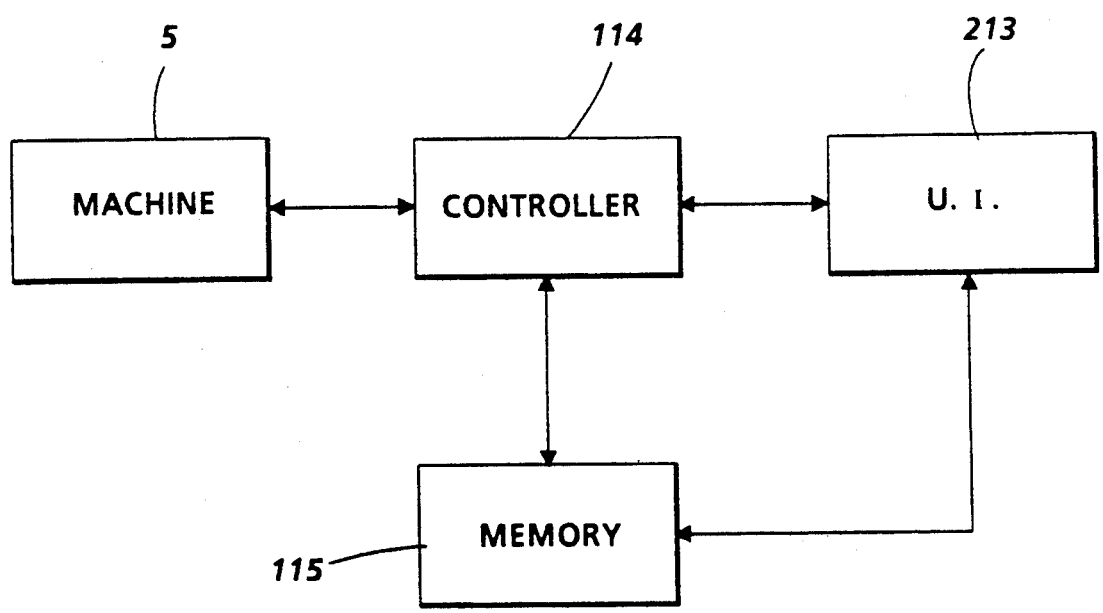
FIG. 3 is a block diagram of the operating control systems and memory of the machine shown in FIG. 1.

For a general understanding of the features of the present invention, reference is made to the drawings. In the drawings, like reference numerals have been used throughtout to identify identical elements. Referring to FIGS. 1, 2, and 3, there is shown an electrophotographic reproduction machine 5 composed of a plurality of programmable components and sub-systems which cooperate to carry out the copying or printing job programmed through the touch dialogue User Interface (U.I.) of the present invention. It will become evident from the following discussion that the touch dialogue U.I. of the present invention may be employed in a wide variety of devices and is not specifically limited in its application to the particular embodiment depicted herein.

Machine 5 employs a photoconductive belt 10. Belt 10 is entrained about stripping roller 14, tensioning roller 16, idler rollers 18, and drive roller 20. Drive roller 20 is rotated by a motor coupled thereto by suitable means such as a belt drive. As roller 20 rotates, it advances belt 10 in the direction of arrow 12 through the various processing stations disposed about the path of movement thereof.

Initially, the photoconductive surface of belt 10 passes through charging station A where two corona generating devices, indicated generally by the reference numerals 22 and 24 charge photoconductive belt 10 to a relatively high, substantially uniform potential. Next, the charged photoconductive belt is advanced through imaging station B. At imaging station B, a document handling unit 26 sequentially feeds documents from a stack of documents in a document stacking and holding tray into registered position on platen 28. A pair of Xenon flash lamps 30 mounted in the optics cavity illuminate the document on platen 28, the light rays reflected from the document being focused by lens 32 onto belt 10 to expose and record an electrostatic latent image on photoconductive belt 10 which corresponds to the informational areas contained within the document currently on platen 28. After imaging, the documents is returned to the document tray via a simplex path when either is a simplex copy or the first pass of a duplex copy is being made or via a duplex path when a duplex copy is being made.

The electrostatic latent image recorded on photoconductive belt 10 is developed at development station C by a magnetic brush developer unit 34 having three developer rolls 36, 38 and 40. A paddle wheel 42 picks up developer material and delivers it to the developer rolls 36, 38. Developer roll 40 is a cleanup roll while a magnetic roll 44 is provided to remove any carrier granules adhering to belt 10.

Following development, the developed image is transferred at transfer station D to a copy sheet. There, the photoconductive belt 10 is exposed to pre-transfer light from a lamp (not shown) to reduce the attraction between photoconductive belt 10 and the toner powder image. Next, a corona generating device 46 charges the copy sheet to the proper magnitude and polarity so that the copy sheet is tacked to photoconductive belt 10 and the toner powder image attracted from the photoconductive belt to the copy sheet. After transfer, corona generator 48 charges the copy sheet to the opposite polarity to detach the copy sheet from belt 10.

Following transfer, a conveyor 50 advances the copy sheet bearing the transferred image to fusing station E where a fuser assembly, indicated generally by the reference numeral 52 permanently affixes the toner powder image to the copy sheet. Preferably, fuser assembly 52 image on the copy sheet contacting fuser roller 54.

After fusing, the copy sheets are fed through a decurler 58 to remove any curl. Forwarding rollers 60 then advance the sheet via duplex turn roll 62 to gate 64 which guides the sheet to either finishing station F or to duplex tray 66, the latter providing an intermediate or buffer storage for those sheets that have been printed on one side and on which an image will be subsequently printed on the second, opposed side thereof. The sheets are stacked in duplex 66 face down on top of one another in the order in which they are copied.

To complete duplex copying, the simplex sheets in tray 66 are fed, in seriatim, by bottom feeder 68 back to transfer station D via conveyor 70 and rollers 72 for transfer of the second toner powder image to the opposed sides of the copy sheets. The duplex sheet is then fed through the same path as the simplex sheet to be advanced to finishing station F.

Copy sheets are supplied from a secondary tray 74 by sheet feeder 76 or from the auxiliary tray 78 by sheet feeder 80. Sheet feeders 76, 80 are friction retard feeders utilizing a feed belt and take-away rolls to advance successive copy sheets to transport 70 which advances the sheets to rolls 72 and then to transfer station D.

A high capacity feeder 82 is the primary source of copy sheets. Tray 84 of feeder 82, which is supported on an elevator 86 for up and down movement, has a vacuum feed belt 88 to feed successive uppermost sheets from the stack of sheets in tray 84 to take away drive roll 90 and idler rolls 92. Rolls 90, 92 guide the sheet onto transport 93 which in cooperation with idler roll 95 and rolls 72 move the sheet to transfer station station D.

After transfer station D, photoconductive belt 10 passes beneath corona generating device 94 which charges any residual toner particles remaining on belt 10 to the proper polarity. Thereafter, a precharge erase lamp (not shown), located inside photoconductive belt 10, discharges the photoconductive belt in preparation for the next charging cycle. Residual particles are removed from belt 10 at cleaning station G by an electrically biased cleaner brush 96 and two de-toning rolls 98 and 100.

The various functions of machine 5 are regulated by a controller 114 which preferably comprises one or more programmable microprocessors. The controller provides a comparison count of the copy sheets, the number of documents being recirculated, the number of copy sheets selected by the operator, time delays, jam corrections, etc. As will appear, programming and operating control over machine 5 is accomplished through a U.I. 213. Operating and control information, job programming instructions, etc. are stored in a suitable memory 115 which includes both ROM and RAM memory types, the latter being also used to retain jobs programmed through U.I. (User Interface ) 213. And while a single memory is illustrated, it is understood that memory 115 may comprise a series of discrete memories. Conventional sheet path sensors or switches may be utilized to keep track of the position of the documents and the copy sheets. In addition, the controller regulates the various positions of the gates depending upon the mode of operation selected.

Figure 4:
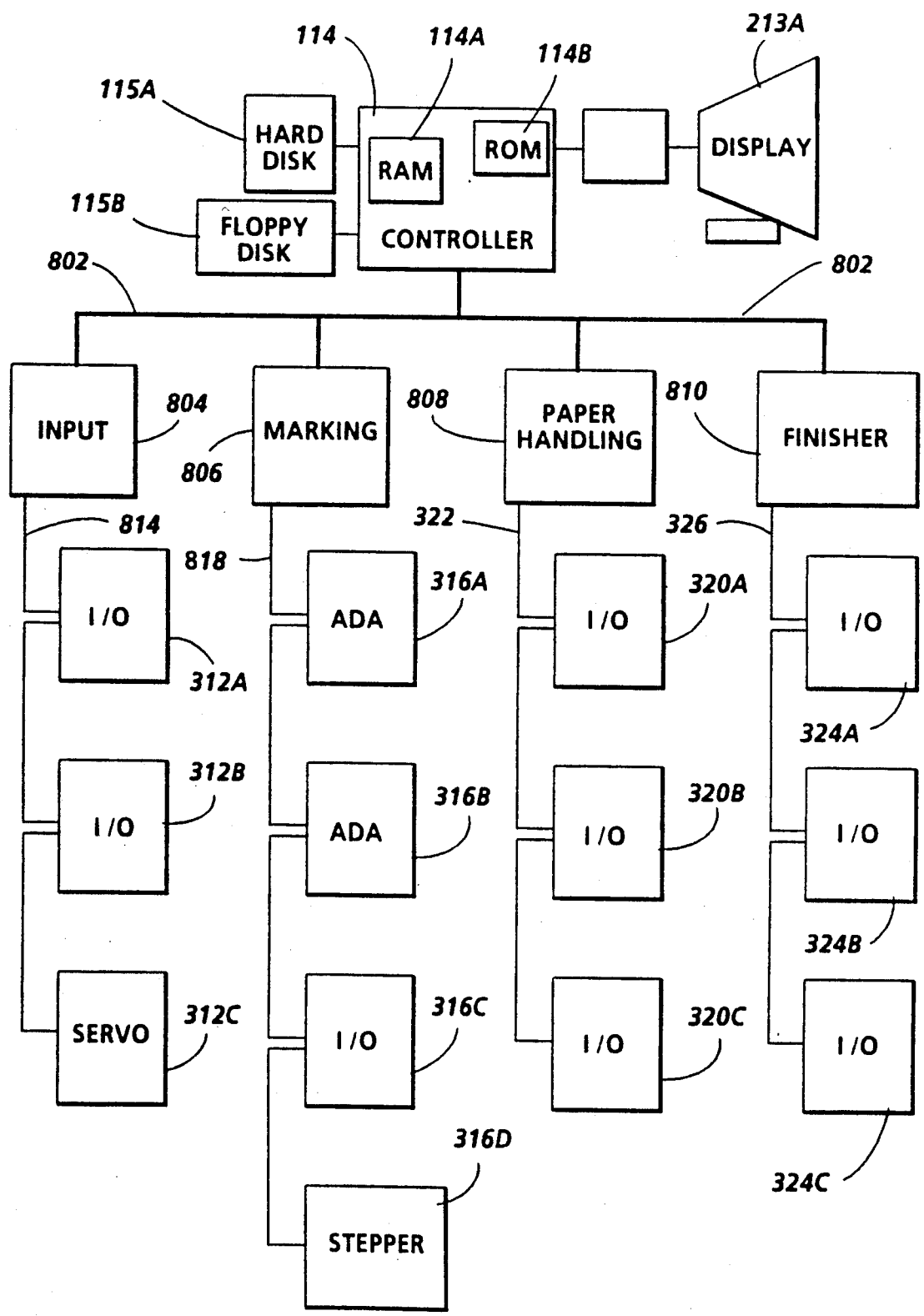
FIG. 4 is a more detailed block diagram of the operating control system of FIG. 3.

With reference to FIG. 4, memory 115 includes a hard or rigid disk drive 115A and a floppy disk drive 115B connected to Controller 114 including RAM 114A and RAM 114B. In a preferred embodiment, the rigid disks are two platter, four head disks with a formatted storage capacity of approximately 20 megabytes. The floppy disks are 3.5 inch, dual sided micro disks with a formatted storage capacity of approximately 720 kilobytes. Preferably, all of the control code and screen display information for the machine is loaded from the rigid disk at machine power up. Changing the data that gets loaded into the machine for execution can be done by exchanging the rigid disk in the machine 5 for another rigid disk with a different version of data or by modifying the contents of the current rigid disk by transferring data from one or more floppy disks onto the rigid disk using the floppy disk drive built into the machine 5. Suitable display 213A of U.I. 213 is also connected to Controller 114 as well as a shared line system bus 302.

The shared line system bus 802 interconnects a plurality of core printed wiring boards including an input station board 804, a making imaging board 806, a paper handling board 808, and a finisher/binder board 810. Each of the core printed wiring boards is connected to local input/output devices through a local bus. For example, the input station board 804 is connected to digital input/output boards 312A and 312B and servo board 312C via local bus 814. The marking imaging board 806 is connected to analog/digital/analog boards 316A, 316B, digital input/output board 316C, and stepper control board 316D through local bus 318. In a similar manner, the paper handling board 808 connects digital input/output boards 320A, B and C to local bus 322, and finisher/binder board 310 connects digital input/output boards 324A, B and C to local bus 326.

Figure 5:
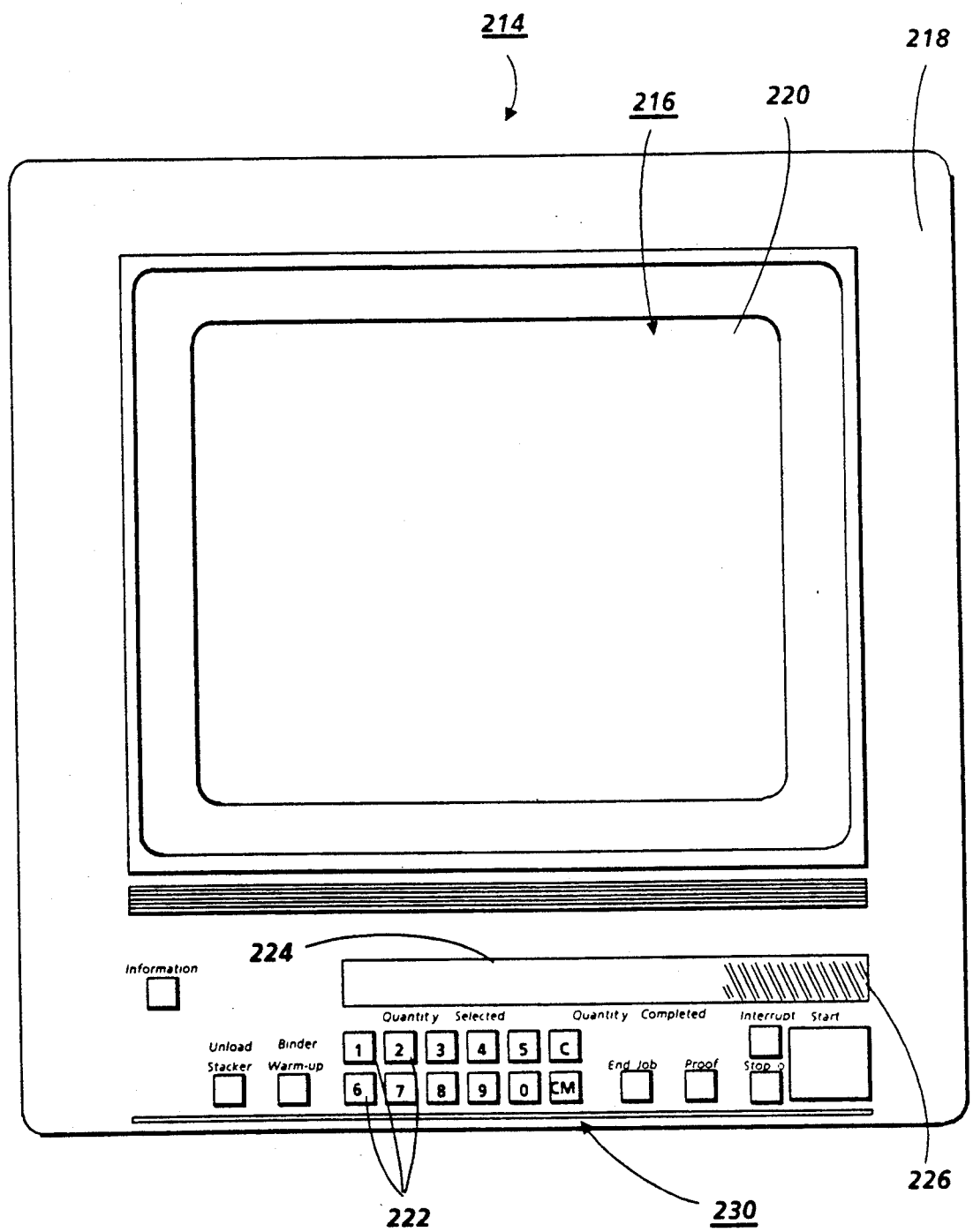
FIG. 5 is a front view of the U.I. color touch monitor showing the soft button display screen and hard button control panel.

Referring to FIG. 5, there is shown the color touch monitor 214 for the touch dialogue U.I. 213 of the present invention. As will appear, monitor 214 provides an operator user interface with hard and soft touch control buttons enabling communication between operator and machine 10. Monitor 214 comprises a suitable color cathode ray tube 216 of desired size and type having a peripheral framework forming a decorative bezel 218 thereabout. Bezel 218 frames a rectangular video display screen 220 on which soft touch buttons in the form of icons or pictograms and messages are displayed as will appear together with a series of hard control buttons 222 and 10 seven segment displays 224 therebelow. Displays 224 provide a display for copy "Quantity Selected", copy "Quantity Completed", and an area 226 for other information.

Hard control buttons 222 comprise "0-9" buttons providing a keypad 230 for programming copy quantity, code numbers, etc.; a clear button "C" to reset display 224; a "Start" button to initiate print; a clear memory button "CM" to reset all dialogue mode features to default and place a "1" in the least significant digit of display 224; an "Unload Stacker" button requesting transfer of the contents of a stacker; a "Stop" button to initiate an orderly shutdown of machine 5; a "Binder Warm-up" button to initiate warm-up of a binder; an "Interrupt" button to initiate a job interrupt; a "Proof" button to initiate making a proof copy; an "End Job" button to end the current job; and an "i" button to initiate a request for information.

Figure 6:
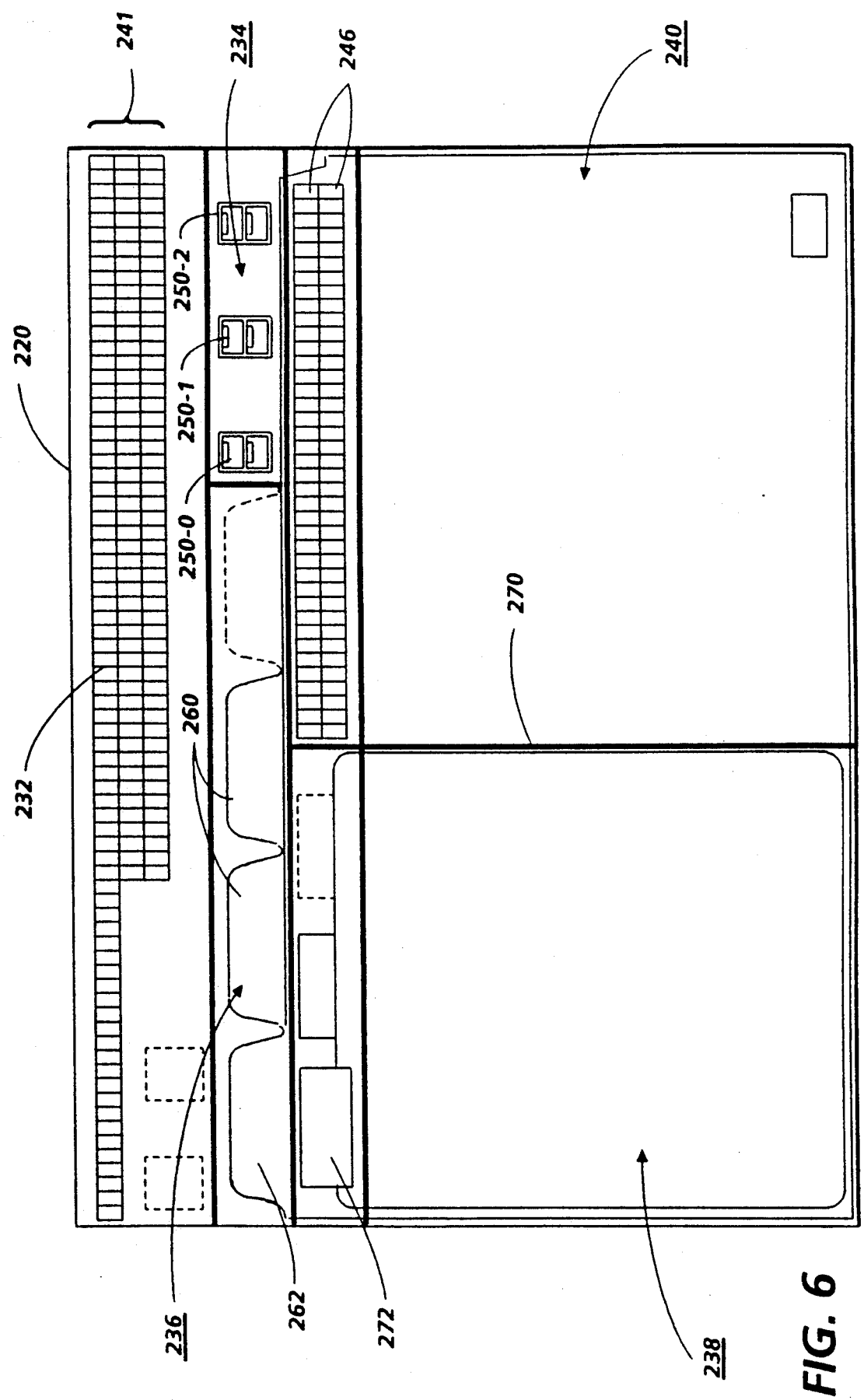
FIG. 6 is a front view of the touch monitor screen with the principal elements of the soft touch dialogue displayed.

Referring now to FIG. 6, for dialogue purposes, screen 220 of monitor 214 is separated into five basic display areas, identified as a message area 232, a dialogue mode selection area 234, a dialogue pathway selection area 236, a scorecard selection area 238, and a work selection area 240.

Message area 232 consists of 3 lines 241 located at the top of screen 220. In addition, two programming conflict message lines 246 are provided in work selection area 240. The dialogue mode selection area 234 comprises an active area containing certain top level dialogue mode controls available to the operator. The mode controls are soft touch buttons 250-0, 250-1, and 250-2 in the form of icons representing file cabinets located on the right side of the screen 220 directly below message area 232.

The dialogue pathway selection area 236 and the scorecard selection area 238 basically simulate a card within a card filing system with primary dialogue pathway file folders 260 and secondary file cards, the latter being referred to as scorecards 270. As will appear, scorecards 270 provide additional programming pathway options. File folders 260 and scorecards 270 are arranged in overlaying relation one in front of the other. The dialogue pathway file folders 260, which are located beneath message area 232 and which extend up into the dialogue mode area 234, each have an outwardly projecting touch tab 262 along the top edge identifying the dialogue pathway represented by the folder, as for example STANDARD, FANFOLD, and OVERSIZED. To allow the file folders 260 to be distinguished from one another without the need to reshuffle the folders each time it is desired to display a folder hidden behind the folder currently displayed, each tab 262 is offset from the other so that tabs 262 are always visible whatever folder is displayed.

Scorecard selection area 238 appears in the lower left corner of screen 220 beneath dialogue selection area 234 and extends to the border of work selection area 240. Scorecard selection area 238 contains a file of scorecards 270 which present the features (first level program selections) available with each of the dialogue pathway file folders 260. Area 238 displays the features (first level program selections) resident with the currently selected scorecard, such selections remaining at previously selected options until either timeout or the "CM" button (FIG. 5) is pressed. Two or three scorecards 270 are typically provided, depending on the dialogue pathway file folder 260 selected. Scorecards 270 each comprise a relatively small file card arranged in overlaying relation to one another so as to simulate a second but smaller card file. Each scorecard 270 has a touch tab 272 dsiplaying the programming pathway options available with the scorecard, such as PROGRAM, EXCEPTION, etc. Scorecard tabs 272 are offset from one another to enable the identity of each scorecard to be determined whatever its position in the scorecard file. Additionally, scorecard tabs 272 are shaped different than the dialogue pathway file folder tabs 262 to prevent confusion.

Work selection area 240 appears in the lower right portion of screen 220, area being beneath the dialogue pathway area 236 and extending from the edge of scorecard selection area 238 to the right side of screen 220. The top two lines 246 of the work selection area 240 are reserved for programming conflicts and prompts with the remaining area used for displaying the feature options (second level program selections) available with the first level program selection that is touched on the scorecard currently selected. As will appear, the operator can scan and make a selection within the work area or pick another scorecard item.

If the operator enters the region of a selectable icon, but drags his finger outside the region, the icon within the region will be SELECTED.

Figure 7:
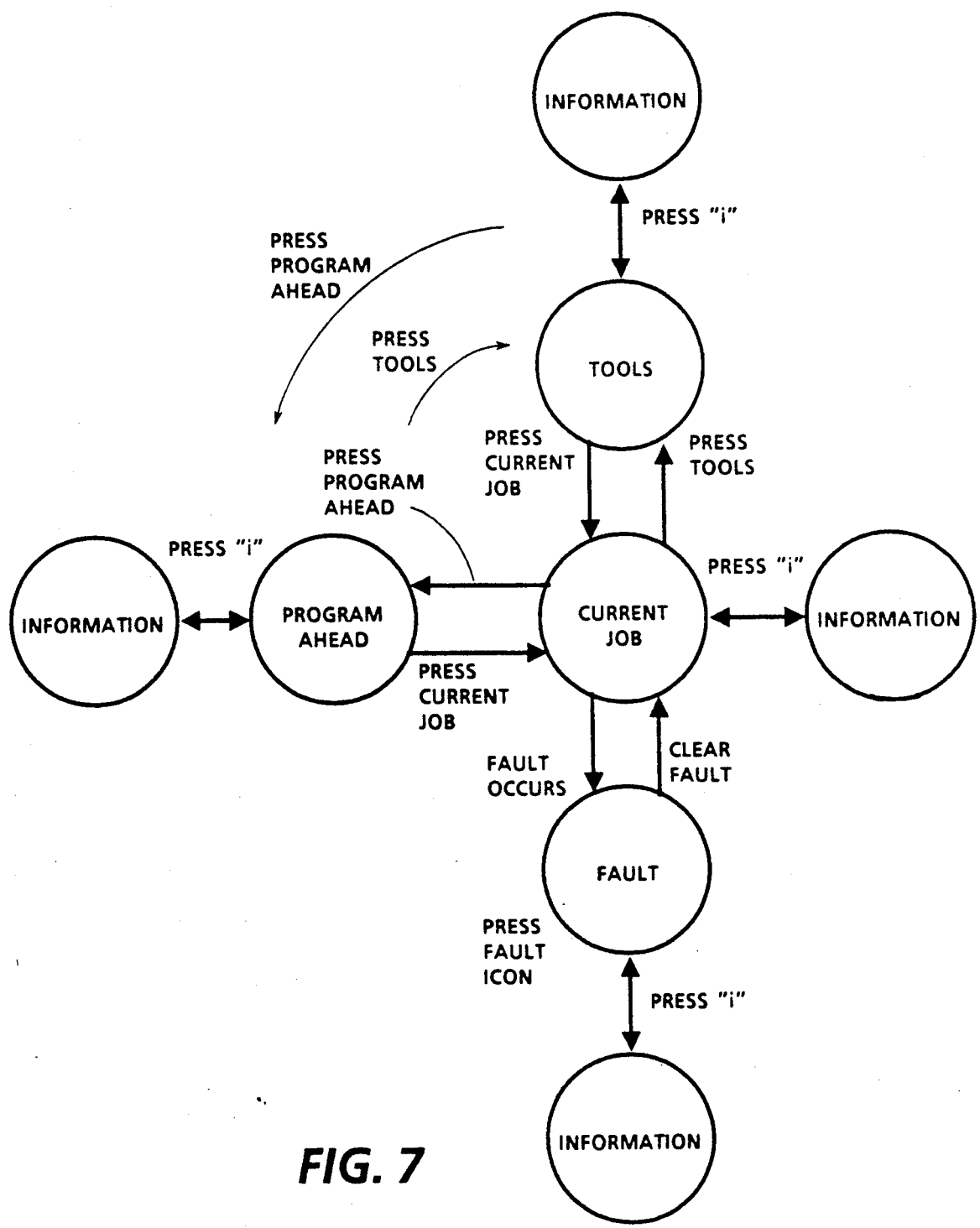
FIG. 7 is a flow chart depicting the U.I. operating states.

Referring particulary to FIG. 7, the five operating states for U.I.213 consist of (1)CURRENT JOB, (2) PROGRAM AHEAD (3) TOOLS, (4) FAULTS, and (5) INFORMATION. The solid line arrows of FIG. 16 define the acceptable paths between the various states. The INFORMATION state is entered by means of the hard control button "i" on bezel 218 while the FAULTS state is in the form of a file card that overlays the file cards currently displayed in the event of a fault. The CURRENT JOB, PROGRAM AHEAD, and TOOLS states are entered by pressing the soft touch bottons 250-0, 250-1 and 250-2 respectively displayed on screen 220 in the Dialogue Mode Selection area 234.

Assume U.I. 213 to be in the CURRENT JOBS state as a result of actuation of soft touch button 250-0. The functions of this state are to inform the operator of the daily tasks that are necessary to keep machine 5 in good working order, to allow the operator to program feature selections for the current job, and to allow the operator to run a copying job. The CURRENT JOB state is sub-divided into three cases: (1) "Job Complete", (2) "Print", and (3) "Job Incomplete". "Job Complete" implies that a job is not in progress and has been completed, "Print" refers to a job in progress, and "Job Incomplete" refers to a job in progress that has either voluntarily or involuntarily been stopped or interrupted. "Job Complete" is defaulted to except for the "Print" case.

The CURRENT JOB state can exit to the PROGRAM AHEAD state by touching the PROGRAM AHEAD button 250-1 in any of the "Job Complete", "Job Incomplete" or "Print" cases; or can exit to the INFORMATION state by pressing the "i" hard button on bezel 218; or can exit to the TOOLS state by touching the TOOLS soft touch button 250-2 in either the "Job Complete" or "Job Incomplete" cases. In addition the CURRENT JOB state will automatically enter the FAULT state when a fault occurs.

Figure 8:
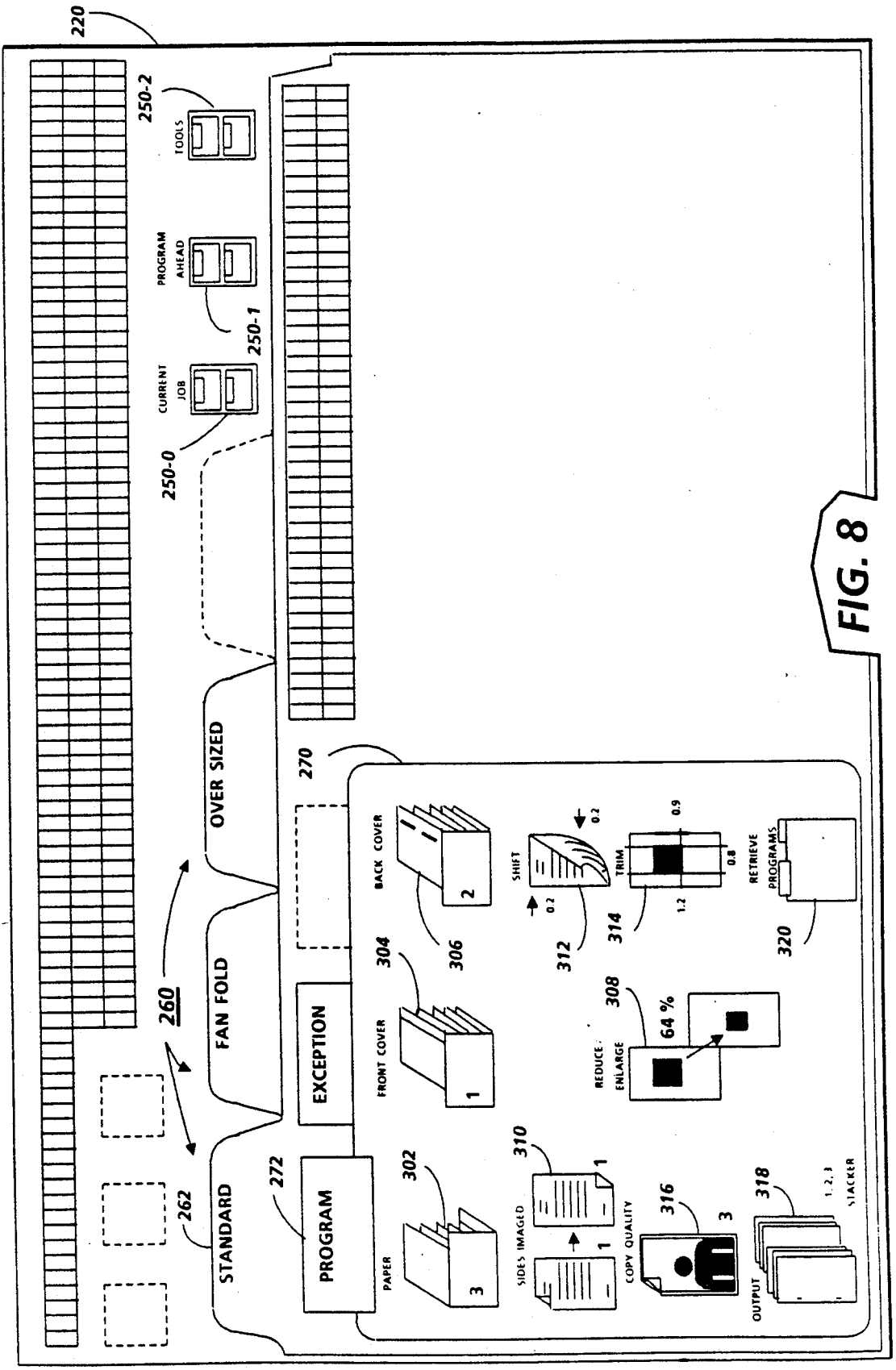
FIG. 8 is a front view depicting the touch monitor screen display in a typical job mode.

When entered in the CURRENT JOB state, the dialogue pathway file folders 26 tabbed STANDARD, OVERSIZES, and FANFOLD are displayed providing various dialogue pathway selections in the form of scorecards 270. For example, in the "Job Complete" case, this file folder provides standard programming options. As seen in FIG. 8, the PROGRAM scorecard 270 is displayed with the following icons presented for selection to the operator: PAPER 302, FRONT COVER 304, BACK COVER 306, REDUCE/ENLARGE 308, TRIM 314, SHIFT 312, SIDES IMAGED 310, COPY QUALITY 316, OUTPUT 318, and RETRIEVE PROGRAMS 320. The EXCEPTION scorecard is also available with this file folder. The "Job Incomplete" and "Print" cases are inactive.

While the preceding description has described operation of U.I. 213 in the CURRENT JOB state entered by touching soft touch button 250-0 on screen 220, it will be understood that other suitable dialogue pathway file folders with scorecards may be displayed on screen 220 by entering one of the PROGRAM AHEAD, TOOLS, FAULTS, or IMFORMATION states. These states are entered by touching of touch button 250-1 (PROGRAM AHEAD) OR BUTTON 250-2 (TOOLS), or in the event a fault occurs (FAULT), or be pressing hard button "i" (INFORMATION) on bezel 218.

For a more detailed description, reference is made to pending application Ser. No. 07/164,365, filed on Mar. 4, 1988 and incorporated herein.

With reference to FIGS. 9a, 9b, 9c and 9d, there is illustrated the jam and almost jam states of the machine. That is, two timing functions $T_1$ and $T_2$ corresponding, for example, to detection of the leading edge of a copy sheet by two sensors along the paper path. The interval $T_N$ therebetween is referred to as the Nominal Time, i.e., the interval or window that occurs under nominal operating conditions.

Figure 9A:
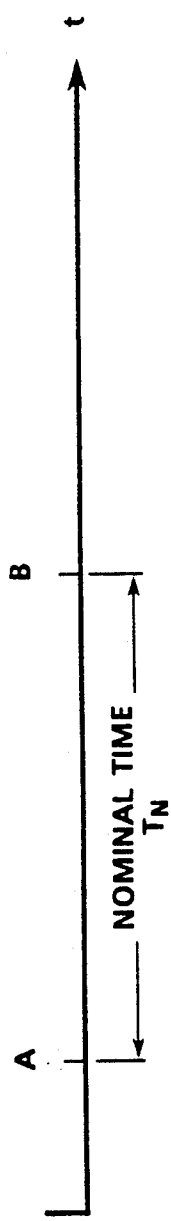
Figure 9B:
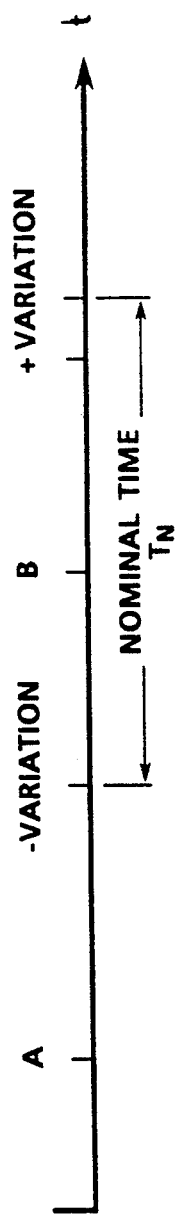

Variations in the machine operating times, however, will cause the timing functions $T_1$ and $T_2$ to shift with resultant displacement of the Nominal Time interval $T_N$. Displacement of the interval $T_N$ is referred to as the Nominal Range, an example of which is shown in FIG. 9b. Variations in machine operating times may be due to variations in line voltage, paper weight, humidity, wear, etc.

Figure 9C:
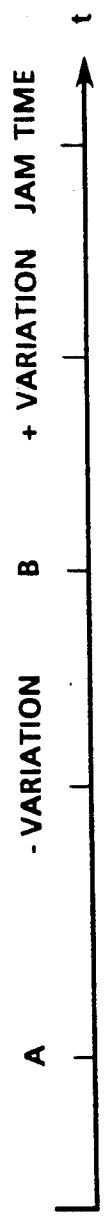
Figure 9D:
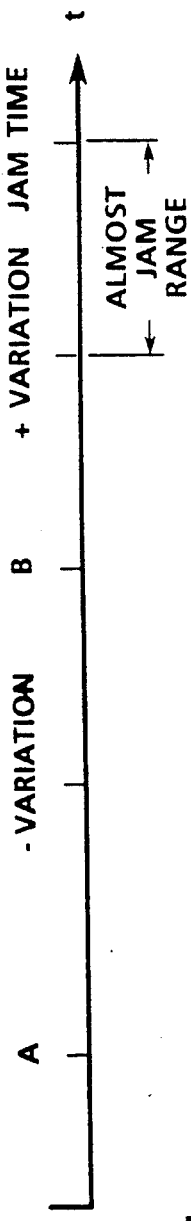

As will be understood, there is a point beyond the upper end of the Nominal Range $T_N$ where a jam will be declared because operation beyond that point cannot be tolerated. This is referred to as the jam time (JT), an example of which is depicted in FIG. 9c. The time interval between $T_N$ and JT is referred to herein as the Almost Jam zone and is shown by way of example in fig. 9b. In the almost Jam Zone, the machine is operating below the expected level of performance, but the timing displacement is not yet a serious enough problem to cause the machine to shut down.

In accordance with the present invention, an on board diagnostic tool automatically computes a rate based upon the number of failures vs. the number of opportunities to fail and stores this rate each time the service mode is accessed. Each time the service mode is exited, this rate is shifted from a current call register to a last call register. The rate stored in that last call register is shifted to a prior call register and so forth until a total of 4 historical rates are stored against each status code. This allows the service rep to review the current rate of failure for the fault that is being diagnosed plus the rate of failure over the last four service visits. This method involves no overt action by the service rep.

In particular, a fault history display mode is entered at the operator console to display machine fault histories, the fault histories including the number of actual faults of selected components. The rate of failure of selected components based on the number of actual failures relative to the number of opportunities to fail is computed, and the computed rate of failure for the selected components is displayed on the display screen.

With reference to FIG. 10, there is illustrated screen 220 with a scorecard selection area 238 and a work selection area 240. Within the scorecard selection area 238 are several touch tabs including fault tab 402, actual (fault/) tab 404, almost (fault) tab 406, and component selection tabs such as PHM tab 408 and DHM tab 409. Within the work selection area 240 is a history table 410 displaying as many as 15 failt codes for machine areas having the highest rate of actual failure for a category of failures.

With respect to FIG. 10, assuming the tab DHM 409 has been selected as well as actual fault tab 404 then table 410 will display DHM actual fault information. DHM refers to the Document Handling Module containing the various sensors and components to drive and track documents through the machine Thus, the table 410 displays the code for as many as 15 components within the Document Handling Module and a history of the failure rate.

With reference to table 410, there is a "code" column to identify various components with the Document Handling Module, a "count" column to record the number of actual faults or malfunction of that particular component since the last recording period, and a "current rate" column displaying the rate or ratio of actual failures to the total number of opportunities to fail. Opportunities to fail is defined as the total number of times a particular components must respond over a period of time in the operation of the machine.

The column "Previous Rates" displays the history of failure ratios for the identified components. The history of failure rates is often a good indicator of the trend toward total failure of a particular component such as sensor or could indicate an adverse trend of components such as belts or pulleys. To review the fault rate history for actual faults, the initial step is to select fault tab 404 and a selected one of the component categories such as 408.

By way of example, Table 410 illustrates the actual fault history of three codes related to the Document Handling Module. The code 05-117 represents that the lead edge of the document is late to an inverter sensor during a document exchange. Code 05-131 represents that the lead edge of the document is late at pre-registration sensors, and Code 05-122 represents that there is an RDH set count error.

The fault history table is a dynamic table. When a fault occurs in relation to a particular component, a new rate of failure is immediately calculated within the system control for that particular component. That is, the ratio of the total number of faults to the total number of opportunities to fail is determined and stored in the current rate location. After a service call, the service rep enables a routine to reset the counters for counting the faults and to move the current rate to the most recent previous rate location in memory.

In accordance with another feature of the present invention, a history table is also maintained on the rate of almost failure or almost jams of selected components. That is, a fault history is entered at the operator console to display machine fault histories, the fault histories including the number of almost faults of selected components. That is, there is a record of times and rate of almost failure for components entering a window or range which is close to an actual fault. The rate of failure of selected components based on the number of almost failures relative to the number of opportunities to fail of the components is computed and the computed rate of failure for the selected components is displayed on the display screen.

With reference to FIG. 11, there is illustrated screen 220 with a scorecard selection area 238 and a work selection area 240. Assuming, the tab PHM 408 has been selected as well as almost fault tab 406 the control will display table 412.

With reference to table 412, there is a "code" column to identify various components in the Paper Handling Module, a "count" column to record the number of almost faults or malfunction of that particular component since the last recording period, and a "current rate" column displaying the rate ratio of almost failures to the total number of opportunities to fail. Opportunities to fail is again defined as the total number of times that a particular components must respond over a period of time in the operation of the machine.

The column "Previous Rates" displays the history of almost failure ratios for the identified components. To review the almost fault rate history, the initial step is to select the almost fault tab 406 and a selected one of the component categories such as 408 are selected to display the almost fault history.

By way of example, table 412 illustrates the almost jam history of three codes related to the Paper Handling Module. Code 10-107 represents that the lead edge of the copy sheet is late at a specific transport sensor. It should be noted that the arrival at the sensor is not in either the preferred range or a window of tolerance, but not so late as to cause the machine to declare a fault and shut down. Code 10-101 represents that the lead edge of the copy sheet is late at a decurler sensor and code 08-155 represents that the trail edge of the copy sheet is late at a specific registration sensor.

Similar to table 410 the almost fault history is a dynamic table. When an almost fault occurs in relation to a particular component, a new ratio of failure is immediately calculated within the system control for that particular component. That is, the ratio of the total number of almost faults to the total number of opportunities to fail is determined and stored in the current rate location. After a service call, the service rep enable a routine to reset the counters for counting the almost faults and to move the current rate to the most recent previous rate location in memory. FIG. 12 is a flow chart illustrating the method of displaying failure rates.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

We claim:

1. A method of storing and displaying information for predicting jams in a reproduction machine having a plurality of components including an operator console and touch sensitive display screen comprising the steps of:

activating a switch to display a diagnostic and service mode on the display screen, entering a fault history mode at the operator console to display a table of machine fault histories, the fault histories including the number of actual faults and the number of amost faults of selected components, computing the rate of failure based on the number of failures and the number of almost failures relative to the number of opportunities to fail of said components, displaying the computed rate of failure for selected components on the display screen since the last service period, and displaying the history of previous computed rates of failure for previous service periods for selected components.

2. A method of storing and displaying machine jam information in a reproduction machine having a plurality of components including an operator console and touch sensitive display screen comprising the steps of:

activating a switch to display a diagnostic and service mode on the display screen, entering a fault history mode at the operator console to display a table of machine fault histories, the fault histories including the number of actual faults of selected components, computing the rate of failure of said plurality of components based on the number of component failures relative to the number of opportunities to fail of said components, displaying the computed rate of failure for selected components on the display screen since the last service period, and displaying the history of previous computed rates of failure for previous service periods for selected components.

3. The method of claim 2 including the steps of computing the rate of failure of said plurality of components based on the number of component failures and component almost failures relative to the number of opportunities to fail of said components and displaying the computed rate of failure for selected components on the screen since the last service period.

4. A method of storing a display machine jam information including the number of actual machine faults and the number of machine almost faults in a reproduction machine having a plurality of components and an operator console with a display screen comprising the steps of:

entering a jam history display mode at the operator console to display machine fault histories, the fault histories including the number of actual faults and the number of almost faults of selected components, computing the rate of failure of selected components based on the number of actual failures and the number of almost failures relative to the number of opportunities to fail of said components, and displaying the computed rate of failure for the selected components on the display screen.

5. A method of determining machine fault information in a reproduction machine having a plurality of components and an operator console with display comprising the steps of:

entering a fault history mode at the operator console, the fault histories including the number of actual faults and the number of almost faults of selected components, and computing the rate of failure of selected components based on the number of actual failures and the number of almost failures of said components for presentation on said display.

* * * * *